United States Patent [19]

Register et al.

[11] Patent Number: 5,606,594
[45] Date of Patent: Feb. 25, 1997

[54] COMMUNICATION ACCESSORY AND METHOD OF TELECOMMUNICATING FOR A PDA

[75] Inventors: David S. Register; Clint H. O'Connor, both of Austin, Tex.

[73] Assignee: Dell USA, L.P., Austin, Tex.

[21] Appl. No.: 187,931

[22] Filed: Jan. 27, 1994

[51] Int. Cl.$^6$ .......................... H04M 1/00; H04M 11/00; H04B 1/38; H04B 1/08
[52] U.S. Cl. .......................... 379/58; 379/357; 379/428; 379/434; 379/447; 455/90; 455/347
[58] Field of Search .......................... 379/58, 357, 428, 379/429, 433, 434, 447, 454, 419; 455/89, 90, 347, 66

[56] References Cited

U.S. PATENT DOCUMENTS

| D. 297,734 | 9/1988 | Soren et al. | D14/64 |
|---|---|---|---|
| 5,127,050 | 6/1992 | Takahashi et al. | 379/428 |
| 5,138,649 | 8/1992 | Krisbergh et al. | 379/58 |
| 5,148,471 | 9/1992 | Metroka et al. | 379/58 |
| 5,276,916 | 1/1994 | Pawlish et al. | 455/89 |
| 5,363,089 | 11/1994 | Goldenberg | 455/347 |
| 5,365,570 | 11/1994 | Boubelik | 379/59 |
| 5,422,656 | 6/1995 | Allard et al. | 345/173 |
| 5,440,529 | 8/1995 | Gray | 379/433 |

OTHER PUBLICATIONS

"Simon" From Bellsouth, designed by IBM, Nov. 1993.
Popular Electronics®, GIZMO:A Chronicle Of Consumer Electronics: The ABC's of PDA's, pp. 51–62, 92, 93.

*Primary Examiner*—Edward L. Coles, Sr.
*Assistant Examiner*—Kimberly A. Williams

[57] ABSTRACT

Disclosed are a telephone accessory and method of telecommunicating for a personal digital accessory ("PDA"). The PDA includes a chassis of particular dimensions and input/output ("I/O") circuitry on a front surface of the chassis, the chassis containing processing circuitry coupled to the I/O circuitry. The telephone accessory comprises: (1) a body portion having a concave surface adapted to receive the chassis and first and second body extensions coupled to opposite ends of the body portion and (2) communications circuitry capable of being coupled to the processing circuitry in the chassis when the chassis is received into the concave surface on the body portion, the communications circuitry including a communications transceiver capable of coupling the processing circuitry to remote processing circuitry via a communications link.

54 Claims, 4 Drawing Sheets

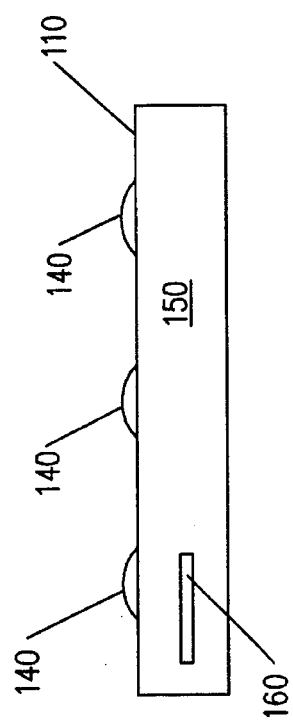
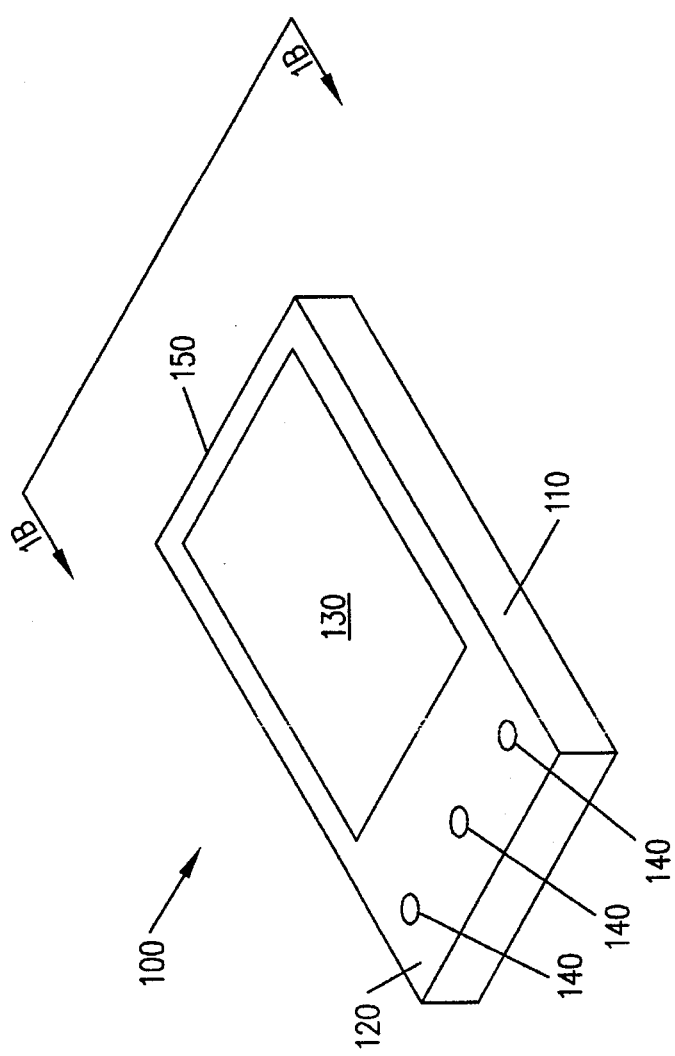
FIG. 1B
FIG. 1A

COMMUNICATION ACCESSORY AND METHOD OF TELECOMMUNICATING FOR A PDA

TECHNICAL FIELD OF THE INVENTION

The present invention is directed, in general, to computer apparatus and, more specifically, to a telephone accessory for a personal digital assistant ("PDA"), the telephone accessory allowing the PDA to function as part of a voice and data telephone.

BACKGROUND OF THE INVENTION

As personal computers have increased in power and decreased in size, portable computers have become more useful and powerful. Initially, "portable" computers were essentially ruggedized desktop computers, requiring use of a desk top and access to household current. Eventually, battery-powered portable computers commonly featuring a liquid crystal display ("LCD") and weighing 10 to 20 pounds allowed true freedom for the computer user. Notebook computers weighing from 4 to 10 pounds and having a length and width approximating that of notebook paper offered an increased degree of portability, without substantially sacrificing desktop computer power.

Since the advent of the notebook computer, evermore smaller computers have been tested in the marketplace. However, these smaller units have not generally enjoyed much success, primarily due to limitations their size places on their input/output ("I/O") devices. In particular, computer users wish to have a visual display that is as large as possible to display data either in greater quantity or with greater clarity. In addition, the size of a human hand dictates that a keyboard for manual data entry must be of a certain minimum size for comfort, speed and accuracy of the data entry. Computers smaller than notebook computers have had to sacrifice both in display and keyboard size, resulting in their being unable to duplicate desktop computer capability, even though their data processing and storage capacity is equivalent.

One smaller-than-notebook computer design, however, has proven useful and quite popular. So-called PDAs, such as Newton® by Apple Computer, Inc., comprise a generally-rectangular chassis having a front surface thereon. The front surface is typically dominated by an LCD visual display device. In contrast to most other computer designs, a PDA does not contain a traditional "QWERTY" or other-style keyboard. Instead, PDAs are equipped with a few control buttons on the front surface and a stylus. A user wishing to enter data to the PDA must use the stylus to write on the display. Depending on the user's preferences, the PDA can store the user's writing as a bitmapped picture, requiring substantial memory to store and limiting the PDA's ability to manipulate the writing. Alternatively, with the aid of handwriting recognition software stored in the PDA, the PDA can translate the writing into representative codes or characters suitable for more efficient processing and storage by the PDA. The stylus and/or the few control buttons on the front surface can also be used to move a pointer around the display to point at portions of a representation of a traditional keyboard shown on the screen. This also allows for entry of codes or characters.

Because a PDA is highly portable and, with the proper software, can act as a telephone directory for storing names and numbers, it becomes desirable to allow the PDA to do more than simply display the names and numbers on the display device for the user to dial manually. Instead, the PDA should form a part of a telecommunications device, an preferably part of a cellular or radio telephone, allowing the PDA to not only play a part in managing voice communications for the user, but to send and receive data.

Accordingly, what is needed in the art is an accessory allowing a PDA to become part of a telecommunications device. The accessory should conform to the shape of the PDA to allow the two to integrate smoothly into a single unit.

SUMMARY OF THE INVENTION

To address the above-discussed deficiencies of the prior art, it is a primary object of the present invention to provide a telephone accessory and method of telecommunicating for a PDA. It is a further object of the present invention that the accessory be a conformal package to the PDA, allowing the two, once mated, to act as a single unit.

Accordingly, in the attainment of the above objects, the present invention provides a communication accessory for a PDA.

The PDA, as is conventional, includes a chassis of particular dimensions and I/O circuitry on a front surface of the chassis. The chassis contains processing circuitry coupled to the I/O circuitry. The communication accessory comprises: (1) a body portion having a concave surface adapted to receive the chassis and first and second body extensions coupled to opposite ends of the body portion and (2) communications circuitry capable of being coupled to the processing circuitry in the chassis when the chassis is received into the concave surface on the body portion, the communications circuitry including a communications transceiver capable of coupling the processing circuitry to remote processing circuitry via a communications link.

The advantage of the above arrangement is that the PDA nests within the body portion of the accessory, yielding a unified assembly. Preferably, the concave surface conforms to the particular dimensions of the chassis to thereby allow the chassis to be received into a recess bounded by the concave surface.

A rear surface of the PDA is placed against the concave surface. Therefore, the front surface of the PDA (containing a display device, a part of the I/O circuitry) remains exposed to allow the user to read or enter information into the PDA in a conventional manner. In fact, the location of the display device is similar to the location of a keypad on a cellular telephone.

In a preferred embodiment of the present invention, the PDA/accessory has a look and feel similar to a standard cellular telephone. The first and second body extensions are pivotally attached to the body portion to allow relative rotation therebetween, the first and second body extensions able to assume a stowed position wherein the first and second body extensions are folded inward so as to overlap the concave surface of the body portion and an operating position wherein the first and second body extensions are unfolded outward so as to extend from the body portion to allow the concave surface to receive the chassis.

The first body extension contains microphone circuitry for converting acoustical energy into electrical energy and the second body extension contains speaker circuitry for converting electrical energy into acoustical energy, the microphone and speaker circuitry coupled to the communications circuitry to allow transmission and reception of voice. Thus, the microphone and speaker are presented to the user in two opposed, rotatable body extensions, allowing the body extensions to be positioned as a telephone receiver for comfort and proper function and allowing the body extensions to be folded when the accessory is not in use to protect the body extensions and yield a smaller profile.

To act in concert, it is necessary to provide for communication of electrical signals between the processing circuitry and the communications circuitry. Accordingly, a first connector is located on a surface of the chassis (preferably a top edge). A corresponding second connector is located on the concave surface. The first and second connectors are capable of electrically coupling the processing circuitry to the communications circuitry when the concave surface receives the chassis.

In a preferred embodiment, the PDA controls the communication accessory, providing signals to initiate and terminate calls and providing substantive data for transmission via a wireless communication link, thereby allowing the accessory to function as a wireless modem or facsimile circuit. Storage circuitry is located within the chassis and coupled to the processing circuitry for storing data for use by the processing and communications circuitry in this capacity.

A further object of the present invention is to provide the accessory with its own power, relieving the PDA battery from also having to power the accessory. Therefore, in a preferred embodiment, the body portion has a surface (preferably an outer surface opposite the concave surface) capable of removably receiving a battery pack. Batteries within the battery pack are capable of being coupled to the communications circuitry. In a more preferred embodiment, the batteries are able to also provide electric power to the PDA, extending the life of the PDA battery.

It is highly desirable that the PDA recognize when it is mated with the accessory, allowing the PDA to shift to an accessory control mode wherein the display device is configured to present a desired picture to the user. Accordingly, a preferred embodiment includes accessory detection circuitry capable of detecting when the communications circuitry is coupled to the processing circuitry. The processing circuitry is capable of displaying information to a user via the I/O circuitry regarding an operation of the accessory.

The present invention further provides a method of deploying a PDA for telecommunication. The method comprises the steps of: (1) rotating first and second body extensions hingedly coupled to first and second ends of the telephone body portion from a stowed position wherein the first and second body extensions are folded outward so as to be substantially parallel to the telephone body portion to an operating position wherein the first and second body extensions are folded inward so as to form an acute angle with respect to the telephone body portion, (2) inserting a substantially rectangular chassis of the PDA into the concave surface of the telephone body portion, the chassis containing processing and storage circuitry, a display device located on a front surface of the chassis and a first electronic link connector on the chassis coupled to the processing and storage circuitry, the first electronic link connector mating with a corresponding second electronic link connector on the telephone body portion, the step of mating coupling the processing and storage circuitry to communications circuitry in the telephone body portion, (3) establishing a communications link between the communications circuitry and a remote transceiver, (4) delivering acoustic energy to a microphone within the first body extension, the microphone converting a voice of a user into a microphone electrical signal, the microphone delivering the microphone electrical signal to the communications circuitry to allow the user to transmit voice information via the communications link, (5) receiving acoustic energy from a speaker within the second body extension, the speaker converting a speaker electrical signal into an acoustic signal for transmission to the user, the communications circuitry delivering the speaker electrical signal to the speaker to allow the user to receive voice information via the communications link and (6) transmitting computer data between the processing and storage circuitry and the remote transceiver via the communications circuit.

The foregoing has outlined rather broadly the features and technical advantages of the present invention so that the detailed description of the invention that follows may be better understood.

Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates an isometric view of a PDA;

FIG. 1B illustrates a top-edge view of the PDA of FIG. 1A;

DETAILED DESCRIPTION

Figure 2A:
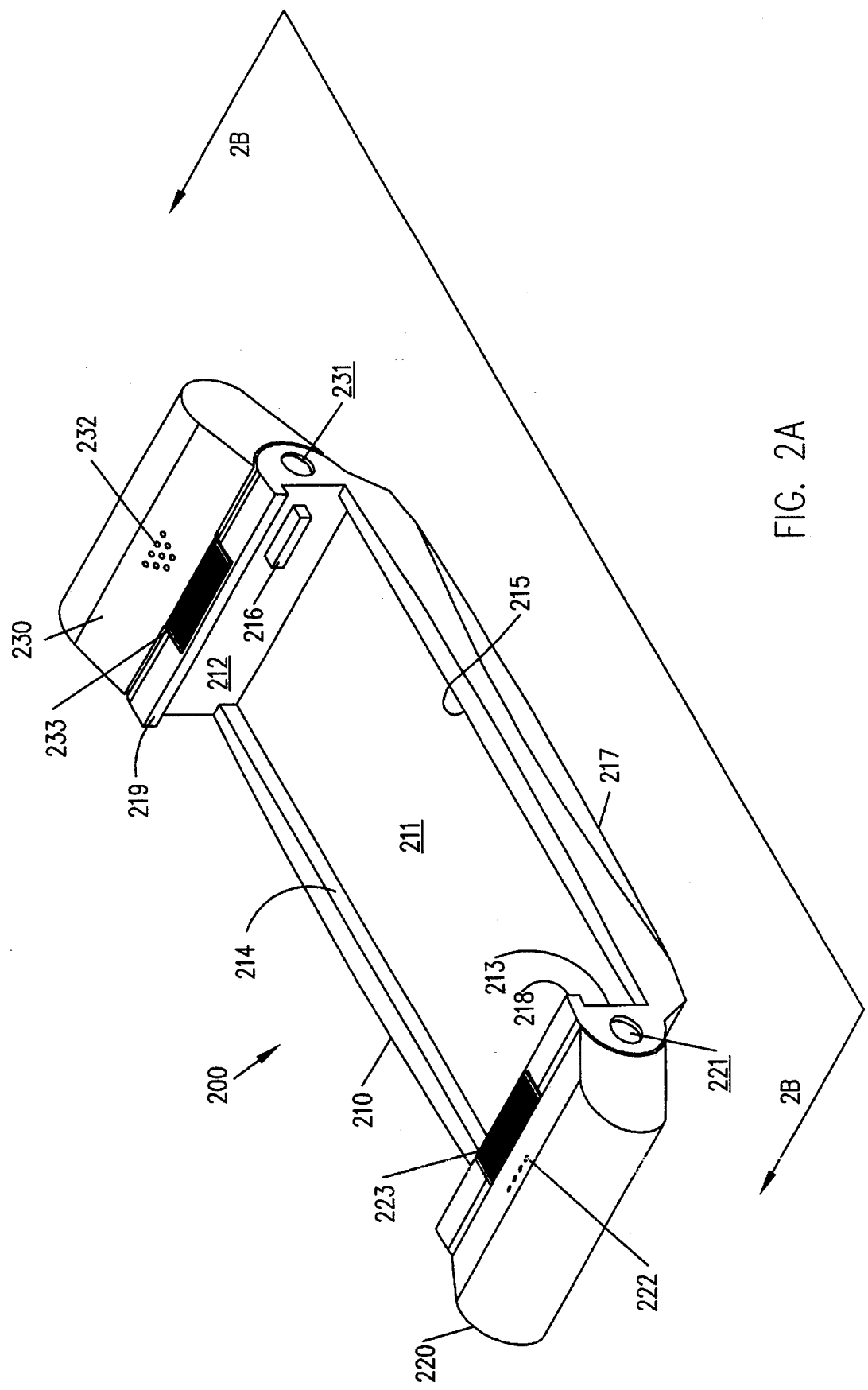
FIG. 2A illustrates an isometric view of a preferred embodiment of a communication accessory of the present invention.

Turning now to FIG. 1A, illustrated is an isometric view of a PDA, generally designated 100. The PDA 100 comprises a substantially rectangular chassis 110 having a particular height, width and thickness (particular dimensions). The chassis has a front surface 120 containing I/O circuitry allowing a user to communicate with the PDA 100. The front surface 120 contains, among other things, a display device 130 (that is conventionally an LCD screen) and one or more buttons or momentary switches 140 that allow a user to enter information. Apart from an electronic link connector on a top edge 150 of the chassis 110, the PDA 100 of FIG. 1A is conventional in its hardware content and arrangement.

Turning now to FIG. 1B, illustrated is a top-edge view of the PDA 100 of FIG. 1A. As mentioned, the top edge 150 contains an electronic link connector 160. Those skilled in the art will recognize that the electronic link connector 160 can be on any surface or edge of the chassis 110. The electronic link connector 160 may be a male or female connector and is recessed within the chassis 110 to protect the electronic link connector 160 from damage when the PDA 100 is not mated to its communication accessory. The electronic link connector may be for a standard serial or parallel interface or for one of proprietary design. The configuration of pins of the electronic link or the particular communication protocol between the PDA 100 and the communication accessory (200 of FIG. 2A) are not germane to the present invention. Those skilled in the art will recognize that, in some circumstances, it may be desirable to provide for analog communication between the PDA 100 and the communication accessory, for instance, when the PDA 100 initiates tone dialing signals or stores or plays back voice mail.

Turning now to FIG. 2A, illustrated is an isometric view of a preferred embodiment of a communication accessory of the present invention, generally designated 200. Those skilled in the art should understand that the illustrated embodiment of the communication accessory 200 provides for wireless communications. The present invention also contemplates use of the communication accessory 200 as a wire-based communication device.

The communication accessory 200 is illustrated to be a telephone accessory, allowing a user to communicate by voice as with a conventional telephone device. As will be described in detail, the communication accessory 200 is adapted and formed to receive the PDA 100 in a conformal manner, such that the PDA 100 and communication accessory 200, once mated, form a unitary structure.

The communication accessory 200 comprises a body portion 210 (or a "telephone body portion", if the communication accessory 200 is to function as a telephone) that is centrally located in the communication accessory 200. The body portion 210 has a concave surface thereon comprising surfaces 211, 212, 213. (The concave surface will be referenced as 211, 212, 213.) The concave surface 211, 212, 213 preferably conforms to the particular dimensions of the chassis 110 of the PDA 100. Thus, the height of the chassis 110 is approximately equal to the length of the surface 211. The width of the chassis 110 is approximately equal to the width of the concave surface 211, 212, 213 and the thickness of the chassis 110 is approximately equal to the height of the surfaces 212, 213. That the concave surface 211, 212, 213 conforms to the particular dimensions of the chassis 110 is not essential to the present invention, as those skilled in the art will recognize. However, a conformal fit on the part of the communication accessory 200 provides the advantage of mating into a unitary structure.

A first body extension 220 is rotatably or hingedly mounted to a lower upper end of the body portion 210, as shown. The first body extension 220 is able to assume one of two stowed positions (not illustrated in FIG. 2A) wherein the first body extension 220 is either folded inward so as to overlap the concave surface 211, 212, 213 of the body portion 210 or is folded outward so as to be substantially parallel to the body portion 210. The first body extension 220 is further able to assume an operating position (illustrated in FIG. 2A) wherein the first body extension 220 is unfolded outward so as to extend at a certain desired angle from the body portion 210 to allow the concave surface 213, 211, 212 to receive the chassis 110. A lock release button 221 allows free rotation of the first body extension 220 when depressed. The first body extension 220 may be provided with a plurality of detents 223, resulting in a number of intermediate positions, selectable to the comfort of the user. The first body extension 220 contains microphone circuitry, including a microphone (not shown). The microphone is acoustically accessible to the user via a microphone grille 222.

In a manner analogous to the first body extension 220, a second body extension 230 is rotatably or hingedly mounted to a lower end of the body portion 210, as shown. The second body extension 230 is able to assume one of two stowed positions (not illustrated in FIG. 2A) wherein the second body extension 230 is either folded inward so as to overlap the concave surface 211, 212, 213 of the body portion 210 or is folded outward so as to be substantially parallel to the body portion 210. The second body extension 230 is further able to assume an operating position (illustrated in FIG. 2A) wherein the second body extension 230 is unfolded outward so as to extend from the body portion 210 to allow the concave surface 213, 211, 212 to receive the chassis 110. A corresponding lock release button 231 allows free rotation of the second body extension 230 when depressed. The second body extension 230 may also be provided with a plurality of detents 233, resulting in a number of intermediate positions, selectable to the comfort of the user. The second body extension 230 contains speaker circuitry, including a speaker (not shown). The speaker is acoustically accessible to the user via a speaker grille 232. The relative locations of the microphone and speaker are similar to those of a conventional telephone receiver.

Deployment of the communication accessory 200 will now be described. Initially, the communication accessory 200 is in one of two possible stowed positions wherein the first and second body extensions 220, 230 are either folded inward so as to overlap the body portion 210 or are extended so as to be substantially parallel to the body portion 210. In either of these stowed positions, the communication accessory 200 assumes a low profile, compact size, suitable for convenient storage. When the first and second body extensions 220, 230 are stowed by being extended parallel with the body portion 210, the PDA 100 can remain installed in the communication accessory 200 while stowed. The first and second body extensions are stowed by being folded inward, the communication accessory 200 decreases in overall length, further compacting its size, but preventing the PDA 100 from remaining installed.

To deploy the communication accessory 200, the user depresses the lock release buttons 231, 221, freeing the respective first and second body extensions 230, 220 to move toward an acute angle with respect to the body portion 210 (the operational position). This rotation, if outward from the stowed position, exposes the entirety of the concave surface 211, 212, 213 in preparation to receive the PDA 100.

The chassis 110 of the PDA 100 is mated to the communication accessory 200 by placing the top edge 150 of the chassis 110 against the surface 212. The electronic link connector 160 of the PDA 100 mates with a corresponding electronic link connector 216 on the surface 212. Again, those skilled in the art will understand that the location of the electronic link connector 216 of the communication accessory 200 is entirely a function of the location of the electronic link connector 160 of the PDA 100. This mating electrically couples processing and storage circuitry in the PDA 100 to communications circuitry in the communication accessory 200 (to be described in conjunction with FIG. 3). Retaining walls 215, 214 provide lateral support for the chassis 110 when mated to the communication accessory 200. As the chassis 110 is rotated into engagement with the communication accessory 200, the chassis 110 urges retention ridges 218, 219 outward. When the chassis 110 is fully seated in the concave surface 211, 212, 213, the retention ridges 218, 219 surmount the front surface 120 of the chassis 110 and snap inward, returning to their original relative position, resiliently capturing the chassis 110 in place. To release the chassis 110 from its mated position, the user places a separation force sufficient to overcome the resilient retention force of the retention ridges 218, 219. The chassis 110 is then free to rotate and translate away from the communication accessory 200.

Figure 2B:
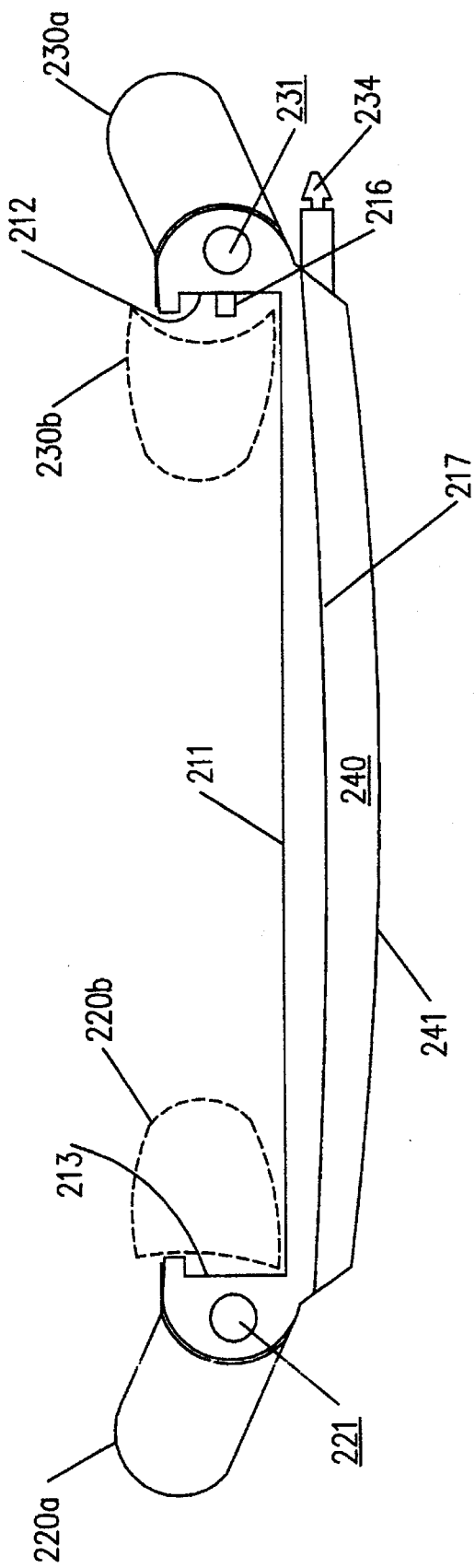
FIG. 2B illustrates a right-side view of the communication accessory of FIG. 2A.

Turning now to FIG. 2B, illustrated is a right-side view of the communication accessory 200 of FIG. 2A. FIG. 2B is presented for the purpose of illustrating both the deployed 230a, 220a and stowed positions 230b, 220b (in broken line) of the first and second body extensions 230, 220 of FIG. 2A.

Also shown is a conformal battery pack 240 adapted to removably attach to an outer surface 217 of the communication accessory 200. The battery pack 240 presents an outward contoured surface 241 that ergonomically conforms to the user's hand, such that addition of the battery pack does not deleteriously affect the utility of the communication accessory 200 as a whole. Communications circuitry within the communication accessory 200 needs power to operate. Although the PDA 100 has battery power of its own, the additional power requirements of the communications circuitry may substantially limit the time during which the communication accessory 200 may be used. Thus, the battery pack 240 may power the communications circuitry or may (in combination with the PDA's battery) power the PDA 100 and the communication accessory 200 jointly. Those skilled in the art will understand that a battery or batteries may be placed permanently within the body portion 210 of the communication accessory 200 instead of being disposed in a removable battery pack 240, as illustrated.

FIG. 2B also shows an extendable dipole antenna 234. The antenna 234 increases the range of the communication accessory 200. The antenna 234 is conventional and is normally stowed when the communication accessory 200 is not in use.

Those skilled in the art will recognize that if the communication accessory 200 is to be used as a wire-based telephone or modem, provision must be made on the body portion 210 for a telephone jack, conventionally an RJ-11 jack, to receive a standard telephone cord.

Figure 3:
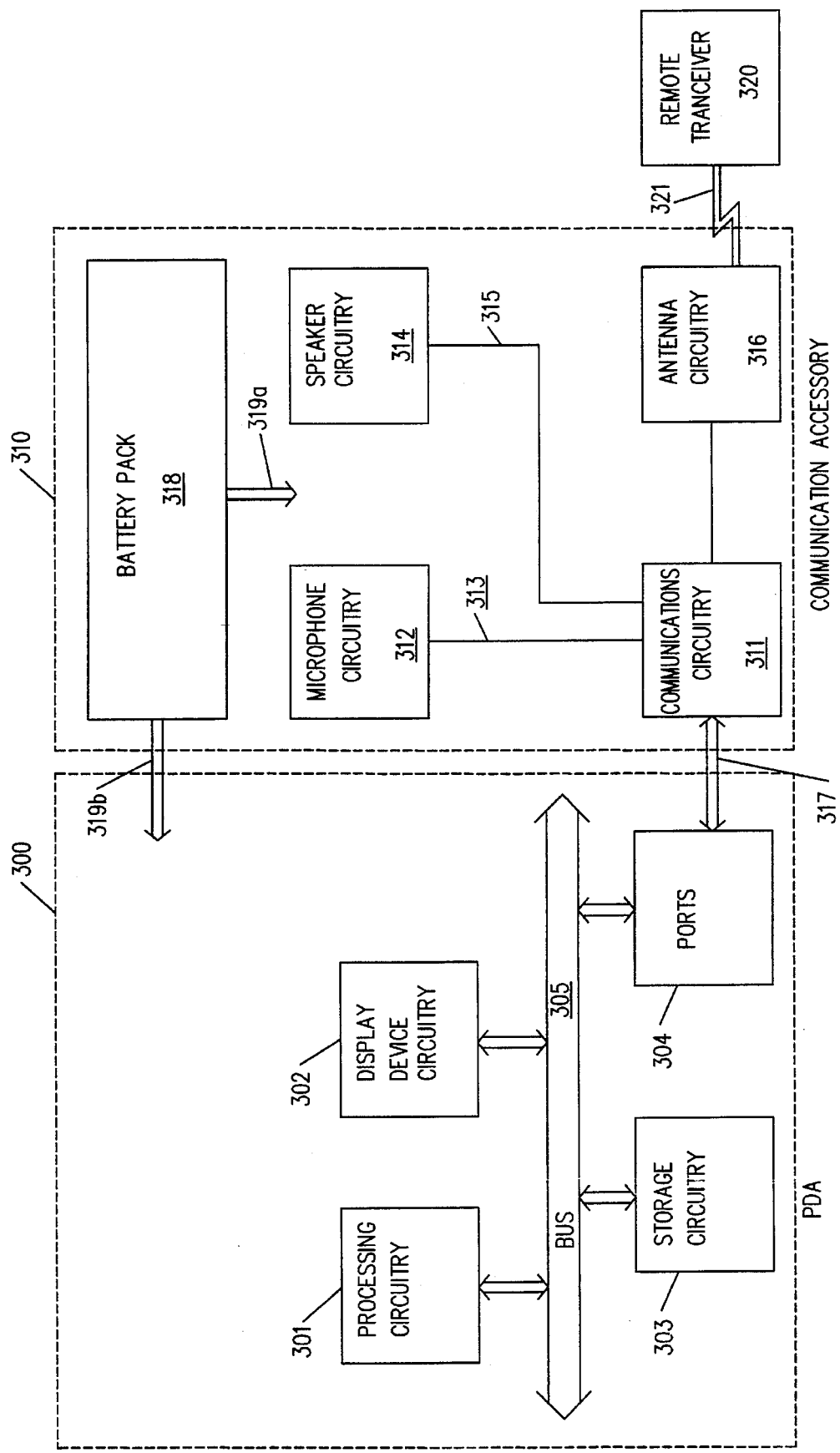
FIG. 3 illustrates a top level block diagram of the PDA of FIG. 1A and the communication accessory of FIG. 2A when mated together.

Turning now to FIG. 3, illustrated is a top level block diagram of the PDA 100 of FIG. 1A and the communication accessory 200 of FIG. 2A when mated together. Circuitry within the PDA 100 is shown within a broken-line box 300. Circuitry within the communication accessory 200 is shown within a broken-line box 310.

Processing circuitry 301 (that may be, as is conventional, a microprocessor central processing unit ("CPU")) is coupled to display device circuitry 302 (a video controller), storage circuitry 303 (most preferably read-only memory ("ROM") and dynamic random access memory ("DRAM")) and ports 304 by a conventional address, data and control bus 305. The circuitry 301, 302, 303, 304 and the arrangement of the same are conventional to PDAs and are familiar to those of ordinary skill in the art. It is also conventional to provide a stylus for input to the PDA 100. Although the FIGUREs do not illustrate a stylus, such are often used to allow a user to enter information via the display device.

The processing circuitry 301 processes data stored in the storage circuitry and interacts with the user via the display device 130 of FIG. 1 (coupled via the display device circuitry 302) and the buttons 140 of FIG. 1 (coupled via the ports 304).

When the PDA 100 is coupled to the communication accessory 200, the processing circuitry 301 and other circuitry within the PDA 100 are coupled via a serial, parallel, or proprietary link 317 (completed by mating the electronic link connectors 160, 216) to communications circuitry 311 within the communication accessory 200. The communications circuitry 311 is adapted to receive control signals from the processing circuitry 301. The communications circuitry 311 is coupled to microphone circuitry 312 and speaker circuitry 314. As previously described, the microphone circuitry 312 produces electrical signals for the communications circuitry 311 that are a function of a user's spoken voice. The speaker circuitry 314 produces sounds that are a function of output from the communications circuitry 311.

To function in a telephone mode, the communications circuitry 311 simply modulates an internally-generated carrier wave with the signal received from the microphone circuitry 312, delivering the modulated carrier wave to antenna circuitry 316 of which the antenna 234 of FIG. 2B is a part. The antenna circuitry 316 produces a radio wave along a wireless link 321 to a remote transceiver 320 to allow wireless communications therewith. Transmissions from the remote transceiver 320 are received in the antenna circuitry 316, demodulated with the aid of the internally-generated carrier wave in the communications circuitry and sent to the speaker circuitry 314. The above telephone mode is conventional and is best illustrated in a common prior art cellular telephone.

To function in a wireless modem mode, the communications circuit contains a conventional modem capable of receiving logic signals from the processing circuitry 301 via the link 317 and converting the signals into sounds suitable for analog radio transmission. Signals received from the remote transceiver 320 are demodulated from the carrier wave and demodulated again in the modem to result in logic signals for transmission via the link 317 to the processing circuitry 301.

In a preferred embodiment of the present invention, the processing circuitry 301 of the PDA 100 is capable of detecting when the PDA 100 is mated to the communication accessory 200. This can be done, for instance, by providing a loopback in the link 317. In response to detection of the presence of the communication accessory 200, the processing circuitry 301 can automatically load software from the storage circuitry 303 pertaining to control of the communication accessory 200. For instance, such software can configure the display device 130 to display a common telephone touchpad, allowing the user to employ a digit or the stylus to enter a telephone number manually. The software can, additionally, make a telephone directory of numbers available to the user for selection therefrom. Finally, the software can allow the user to select whether the communications circuitry 311 is to function in a voice or modem mode. In response, the software can direct, in a conventional manner, the communications circuitry 311 to enter the desired mode and to dial a selected number.

As mentioned previously, a preferred embodiment of the present invention provides for a removable battery pack 240 to be located on an outer surface 217 of the communication accessory. Alternatively, the communication accessory can be equipped with an internal, non-removable ("permanent") battery or an AC adaptor jack to receive power from a power adaptor. FIG. 3 illustrates a battery pack 318 providing power via links 319a, 319b (represented in a highly schematic manner) to the communication accessory 200 and the PDA 100, respectively. The link 319b to the PDA 100 can be made a part of the link 317 so as to minimize connector count, if desired.

From the above description, it is apparent that the present invention provides a telephone accessory and method of telecommunicating for a PDA. The PDA includes a chassis of particular dimensions and I/O circuitry on a front surface of the chassis, the chassis containing processing circuitry coupled to the I/O circuitry. The telephone accessory comprises: (1) a body portion having a concave surface adapted to receive the chassis and first and second body extensions coupled to opposite ends of the body portion and (2) communications circuitry capable of being coupled to the processing circuitry in the chassis when the chassis is received into the concave surface on the body portion, the communications circuitry including a communications transceiver capable of coupling the processing circuitry to remote processing circuitry via a communications link.

Although the present invention and its advantages have been described in detail, it should be understood that various changes, substitutions and alterations can be made herein without departing from the spirit and scope of the invention as defined by the appended claims.

What is claimed is:

1. A wireless communication accessory for use with a personal digital assistant (PDA), said PDA having a chassis of particular dimensions and input/output (I/O) circuitry on a front surface of said PDA chassis, said PDA chassis containing processing circuitry coupled to said I/O circuitry, said communication accessory comprising:

a body portion having an external surface adapted to removably receive said PDA chassis; and communications circuitry capable of being coupled to said processing circuitry in said PDA chassis when said PDA chassis is removably received by said external surface on said body portion, said communications circuitry including a communications transceiver capable of coupling said processing circuitry to remote processing circuitry via a communications link.

2. The accessory as recited in claim 1 wherein said body portion includes first and second body extensions coupled to opposite ends of said body portion; and wherein said first body extension contains microphone circuitry for converting acoustical energy into electrical energy and said second extension contains speaker circuitry for converting electrical energy into acoustical energy, said microphone and speaker circuitry coupled to said communications circuitry to allow transmission and reception of voice.

3. The accessory as recited in claim 1 wherein said body portion includes first and second body extensions coupled to opposite ends of said body portion; and wherein said first and second body extensions are pivotally attached to said body portion to allow relative rotation therebetween, said first and second extensions able to assume a stowed position wherein said first and second body extensions are substantially parallel to said body portion and an operating position wherein said first and second body extensions are folded inward so as to form an acute angle with respect to said body portion.

4. The accessory as recited in claim 1 wherein said body portion includes first and second body extensions coupled to opposite ends of said body portion; and wherein said first and second body extensions are pivotally attached to said body portion to allow relative rotation therebetween, said first and second body extensions able to assume a stowed position wherein said first and second body extensions are folded inward so as to overlap said concave surface of said body portion and an operating position wherein said first and second body extensions are unfolded outward so as to extend from said body portion to allow said concave surface to receive said chassis.

5. The accessory as recited in claim 1 wherein said external surface of said body portion conforms to said particular dimensions of said chassis to thereby allow said chassis to be received into a recess bounded by said external surface of said body portion.

6. The accessory as recited in claim 1 further comprising:

a first connector located on a surface of said chassis and a corresponding second connector located on said external surface of said body portion, said first and second connectors capable of removably and electrically coupling said processing circuitry to said communications circuitry when said external surface receives said chassis.

7. The accessory as recited in claim 1 further comprising storage circuitry located within said chassis and coupled to said processing circuitry for storing data for use by said processing and communications circuitry.

8. The accessory as recited in claim 1 wherein said body portion has a surface capable of removably receiving a battery pack, batteries within said battery pack capable of being coupled to said communications circuitry.

9. The accessory as recited in claim 1 wherein said communication accessory contains a permanent battery capable of supplying electric power to said processing circuitry.

10. The accessory as recited in claim 1 further comprising accessory detection circuitry capable of detecting when said communications circuitry is coupled to said processing circuitry.

11. The accessory as recited in claim 1 wherein said processing circuitry is capable of displaying information to a user via said I/O circuitry regarding an operation of said accessory.

12. A method of providing communications for a personal digital assistant (PDA), said PDA having a chassis of particular dimensions and input/output (I/O) circuitry on a front surface of said PDA chassis, said chassis containing processing circuitry coupled to said I/O circuitry, comprising the steps of:

removably receiving an external surface of said PDA chassis onto an external surface of a body portion of a wireless communication accessory, said communication accessory having first and second body extensions coupled to opposite ends of said body portion; and coupling communications circuitry within said communication accessory to said processing circuitry in said PDA chassis when said PDA chassis is removably received by said external surface on said body portion, said communications circuitry including a communications transceiver capable of coupling said processing circuitry to remote processing circuitry via a communications link.

13. The method as recited in claim 12 further comprising the steps of:

converting acoustical energy into electrical energy with microphone circuitry within said first body extension;

converting electrical energy into acoustical energy with speaker circuitry within said second body extension; and coupling said microphone and speaker circuitry to said communications circuitry to allow transmission and reception of voice.

14. The method as recited in claim 12 further comprising the step of pivoting said first and second body extensions with respect to said body portion, said first and second body extensions able to assume a stowed position wherein said first and second body extensions are substantially parallel to said body portion and an operating position wherein said first and second body extensions are folded inward so as to form an acute angle with respect to said body portion.

15. The method as recited in claim 12 further comprising the step of pivoting said first and second body extensions with respect to said body portion, said first and second body extensions able to assume a stowed position wherein said first and second body extensions are folded inward so as to overlap said external surface of said body portion and an operating position wherein said first and second body extensions are unfolded outward so as to extend from said body portion to allow said external surface to receive said chassis.

16. The method as recited in claim 12 wherein said external of said body portion surface conforms to said particular dimensions of said chassis to thereby allow said chassis to be received into a recess bounded by said external surface.

17. The method as recited in claim 12 further comprising the step of:

electrically and removably coupling said processing circuitry to said communications circuitry with a first connector located on a surface of said chassis and a corresponding second connector located on said external surface of said body portion when said external surface receives said chassis.

18. The method as recited in claim 12 further comprising the step of coupling storage circuitry located within said chassis to said processing circuitry, said storage circuitry capable of storing data for use by said processing and communications circuitry.

19. The method as recited in claim 12 further comprising the steps of:

removably receiving a battery pack onto a surface of said body portion; and coupling batteries within said battery pack to said communications circuitry.

20. The method as recited in claim 12 further comprising the step of supplying electric power to said processing circuitry with a permanent battery within said communication accessory.

21. The method as recited in claim 12 further comprising the step of detecting when said communications circuitry is coupled to said processing circuitry with accessory detection circuitry.

22. The method as recited in claim 12 further comprising the step of displaying information to a user via said I/O circuitry regarding an operation of said accessory.

23. A wireless telephone accessory for use with a personal digital assistant (PDA), the PDA having a chassis of particular dimensions and a display device on a front surface of said chassis, said chassis containing processing circuitry coupled to said display device, said telephone accessory comprising:

a body portion having a recessed, external surface adapted to removably receive an external surface of said PDA chassis and first and second body extensions coupled to opposite ends of said body portion and pivotally attached to said body portion to allow relative rotation therebetween, said first and second body extensions able to assume a stowed position wherein said first and second body extensions are folded outward so as to be substantially parallel to said body portion and an operating position wherein said first and second body extensions are folded inward so as to form an acute angle with respect to said body portion;

a microphone circuit capable of converting acoustical energy into electrical energy located in said first body extension;

a speaker circuit capable of converting electrical energy into acoustical energy located in said second body extension; and communications circuitry capable of being removably coupled to said processing circuitry in said PDA chassis when said external surface of said PDA chassis is received into said recessed, external surface on said body portion, said communications circuitry including a communications transceiver capable of coupling said microphone, speaker and processing circuitry to a remote transceiver via a wireless telephone link.

24. The accessory as recited in claim 23 wherein said recessed surface conforms to said particular dimensions of said chassis to thereby allow said chassis to be received into a recess bounded by said recessed surface.

25. The accessory as recited in claim 23 further comprising:

a first connector located on a surface of said chassis and a corresponding second connector located on a surface of said body portion, said first and second connectors capable of electrically coupling said processing circuitry to said communications circuitry when said recessed surface receives said chassis.

26. The accessory as recited in claim 23 further comprising storage circuitry located within said chassis and coupled to said processing circuitry for storing data for use by said processing and communications circuitry.

27. The accessory as recited in claim 23 wherein said body portion has a surface capable of removably receiving a battery pack, batteries within said battery pack capable of being coupled to said communications circuitry.

28. The accessory as recited in claim 23 wherein said telephone accessory contains a permanent battery capable of supplying electric power to said processing circuitry.

29. The accessory as recited in claim 23 further comprising accessory detection circuitry capable of detecting when said communications circuitry is coupled to said processing circuitry.

30. The accessory as recited in claim 23 wherein said processing circuitry is capable of displaying information to a user via said display device regarding an operation of said accessory.

31. The accessory as recited in claim 23 wherein said processing circuitry is capable of transmitting dialing signals to said communications circuitry, said dialing signals capable of causing said communications circuity to open said wireless telephone link and dial a telephone number.

32. The accessory as recited in claim 23 wherein said communications circuitry is capable of receiving a portion of a content of storage circuitry within said PDA for communication via said wireless telephone link.

33. A method of providing communications for a personal digital assistant (PDA), said PDA having a chassis of particular dimensions and a display device on a from surface of said chassis, said chassis containing processing circuitry coupled to said display device, comprising the steps of:

removably receiving an external surface of said PDA chassis into a concave, external surface of a body portion of a telephone accessory, said telephone accessory having first and second body extensions coupled to opposite ends of said body portion and pivotally attached to said body portion to allow relative rotation therebetween, said first and second body extensions able to assume a stowed position wherein said first and second body extensions are folded outward so as to be substantially parallel to body portion and an operating position wherein said first and second body extensions are folded inward so as to form an acute angle with respect to said body portion;

removably coupling communications circuitry to said processing circuitry in said PDA chassis when said PDA chassis is received into said concave, external surface on said body portion;

converting acoustical energy into electrical energy with a microphone circuit located in said first body extension; and converting electrical energy into acoustical energy with a speaker circuit located in said second body extension, said communications circuitry including a communications transceiver capable of coupling said microphone, speaker and processing circuitry to a remote transceiver via a wireless telephone link.

34. The method as recited in claim 33 wherein said concave surface conforms to said particular dimensions of said chassis to thereby allow said chassis to be received into a recess bounded by said concave surface.

35. The method as recited in claim 33 further comprising the step of:

electrically coupling said processing circuitry to said communications circuitry with a first connector located on a surface of said chassis and a corresponding second connector located on said concave surface when said concave surface receives said chassis.

36. The method as recited in claim 33 further comprising the step of coupling storage circuitry located within said chassis to said processing circuitry, said storage circuitry capable of storing data for use by said processing and communications circuitry.

37. The method as recited in claim 33 further comprising the steps of:

removably receiving a battery pack onto a surface of said body portion; and coupling batteries within said battery pack to said communications circuitry.

38. The method as recited in claim 33 further comprising the step of supplying electric power to said processing circuitry with a permanent battery within said telephone accessory.

39. The method as recited in claim 33 further comprising the step of detecting when said communications circuitry is coupled to said processing circuitry with telephone accessory detection circuitry.

40. The method as recited in claim 33 further comprising the step of displaying information to a user via said display device regarding an operation of said telephone accessory.

41. The method as recited in claim 33 further comprising the step of transmitting dialing signals to said communications circuitry with said processing circuitry, said dialing signals capable of causing said communications circuitry to open said wireless telephone link and dial a telephone number.

42. The method as recited in claim 33 further comprising the step of receiving a portion of a content of storage circuitry within said PDA for communication via said wireless telephone link.

43. A personal digital assistant (PDA), comprising:

a substantially rectangular chassis;

processing and storage circuitry within said chassis;

a display device located on a front surface of said chassis;

a first electronic link connector on said chassis, said first electronic link connector coupled to said processing and storage circuitry;

a telephone body portion containing wireless communications circuitry and having a concave surface substantially conforming to an exterior dimension of said chassis, said concave surface removably mating with a rear surface of said chassis, a second electronic link connector on said concave surface and coupled to said wireless communications circuitry removably mating to said first electronic link connector to thereby couple said processing and storage circuitry to said communications circuitry, said processing and storage circuitry capable of controlling said wireless communications circuitry to establish a communications link between said processing and storage circuitry and a remote transceiver;

a first body extension hingedly coupled to a first end of said telephone body portion and containing a microphone for conveying a voice of a user into a microphone electrical signal, said microphone delivering said microphone electrical signal to said communications circuitry to allow said user to transmit voice information via said communications link;

a second body extension hingedly coupled to a second end of said telephone body portion and containing a speaker for converting a speaker electrical signal into an acoustic signal for transmission to said user, said communications circuitry delivering said speaker electrical signal to said speaker to allow said user to receive voice information via said communications link; and means for allowing said communications circuit to transmit computer data.

44. The PDA as recited in claim 43 wherein said body portion has a surface capable of removably receiving a battery pack, batteries within said battery pack capable of being coupled to said communications circuitry.

45. The PDA as recited in claim 43 wherein said body portion contains a permanent battery capable of supplying electric power to said processing circuitry.

46. The PDA as recited in claim 43 further comprising detection circuitry capable of detecting when said communications circuitry is coupled to said processing circuitry.

47. The PDA as recited in claim 43 wherein said processing circuitry is capable of displaying information to said user via said display device regarding an operation of said communications circuitry.

48. The PDA as recited in claim 43 wherein said communications circuitry comprises cellular telephone circuitry.

49. A method of deploying a personal digital assistant (PDA) for telecommunication, comprising the steps of:

rotating first and second body extensions hingedly coupled to first and second ends of said telephone body portion from a stowed position wherein said first and second body extensions are folded outward so as to be substantially parallel to said telephone body portion to an operating position wherein said first and second body extensions are folded inward so as to form an acute angle with respect to said telephone body portion;

inserting a substantially rectangular chassis of said PDA into said concave surface of said telephone body portion, said chassis containing processing and storage circuitry, a display device located on a front surface of said chassis and a first electronic link connector on said chassis coupled to said processing and storage circuitry, said first electronic link connector mating with a corresponding second electronic link connector on said telephone body portion, said step of mating coupling said processing and storage circuitry to communications circuitry in said telephone body portion;

establishing a communications link between said communications circuitry and a remote transceiver;

delivering acoustic energy to a microphone within said first body extension, said microphone converting a voice of a user into a microphone electrical signal, said microphone delivering said microphone electrical signal to said communications circuitry to allow said user to transmit voice information via said communications link;

receiving acoustic energy from a speaker within said second body extension, said speaker converting a speaker electrical signal into an acoustic signal for transmission to said user, said communications circuitry delivering said speaker electrical signal to said speaker to allow said user to receive voice information via said communications link; and transmitting computer data via said communications circuit.

50. The method as recited in claim 49 further comprising the steps of:

removably receiving a battery pack onto a surface of said body portion; and coupling batteries within said battery pack to said communications circuitry.

51. The method as recited in claim 49 further comprising the step of supplying electric power to said processing and storage circuitry with a permanent battery within said telephone body portion.

52. The method as recited in claim 49 further comprising the step of detecting when said communications circuitry is coupled to said processing and storage circuitry.

53. The method as recited in claim 49 further comprising the step of displaying information to said user via said display device regarding an operation of said communications circuitry.

54. The method as recited in claim 49 wherein said communications circuitry comprises cellular telephone circuitry.

* * * * *